(12) United States Patent
Sandford

(10) Patent No.: US 6,888,970 B2
(45) Date of Patent: May 3, 2005

(54) WAVELET TRANSFORMATION ENGINE

(75) Inventor: Mark J. Sandford, Lake Forrest, CA (US)

(73) Assignee: LightSurf Technologies, Inc., Santa Cruz, CA (US)

( * ) Notice: Subject to any disclaimer, the term of this patent is extended or adjusted under 35 U.S.C. 154(b) by 715 days.

(21) Appl. No.: 10/010,567

(22) Filed: Nov. 8, 2001

(65) Prior Publication Data

US 2002/0143834 A1 Oct. 3, 2002

Related U.S. Application Data

(60) Provisional application No. 60/262,568, filed on Jan. 18, 2001.

(51) Int. Cl.[7] .............................. G06K 9/54; G06K 9/60
(52) U.S. Cl. ....................................... 382/302; 382/240
(58) Field of Search ................................ 382/240, 248, 382/302, 303, 304, 263, 264; 708/300, 308, 313, 400, 406

(56) References Cited

U.S. PATENT DOCUMENTS

| | | | |
|---|---|---|---|
| 4,674,125 A | * | 6/1987 | Carlson et al. ............. 382/303 |
| 5,453,945 A | * | 9/1995 | Tucker et al. ............... 708/400 |
| 5,848,193 A | | 12/1998 | Garcia |
| 5,917,542 A | | 6/1999 | Moghadam et al. |
| 6,028,807 A | | 2/2000 | Awsienko |
| 6,064,437 A | | 5/2000 | Phan et al. |
| 6,091,777 A | | 7/2000 | Guetz et al. |
| 6,125,201 A | | 9/2000 | Zador |

FOREIGN PATENT DOCUMENTS

| | | |
|---|---|---|
| EP | 0763943 A2 | 3/1997 |
| WO | WO 9960793 A1 | 11/1999 |
| WO | WO 0075859 A1 | 12/2000 |

* cited by examiner

*Primary Examiner*—Phuoc Tran
(74) *Attorney, Agent, or Firm*—Blakely Sokoloff Taylor & Zafman LLP; Judith A. Szepesi

(57) ABSTRACT

An ASIC-implemented wavelet transformation engine (circuit) providing a wavelet filter is described. The wavelet filter itself provides up to a 9-stage FIR (finite impulse response) filter with symmetrical coefficients. The architecture of the filter includes data inputs, a bank of shift registers (register bank), coefficient registers, a multiplier/accumulator, a sub-sampling component, and output (results) registers. The filter provides a wavelet-based compression solution that may be implemented in less-costly, page-based memory architecture (e.g., SDRAM), and does so in a manner that overcomes the inherent speed disadvantage encountered due to the horizontal-optimized access strategy employed by page-based memory architectures.

70 Claims, 4 Drawing Sheets

WAVELET TRANSFORMATION ENGINE

RELATED APPLICATIONS

The present application is related to and claims the benefit of priority of the following commonly-owned provisional application(s): application Ser. No. 60/262,568, filed Jan. 18, 2001, entitled "Wavelet Transformation Engine", of which the present application is a non-provisional application thereof. The disclosure of the foregoing application is hereby incorporated by reference in its entirety, including any appendices or attachments thereof, for all purposes.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to digital image processing and, more particularly, to wavelet-based compression of digital images.

2. Description of the Background Art

Today, digital imaging, particularly in the form of digital cameras, is a prevalent reality that affords a new way to capture photos using a solid-state image sensor instead of traditional film. A digital camera functions by recording incoming light on some sort of sensing mechanisms and then processes that information (basically, through analog-to-digital conversion) to create a memory image of the target picture. A digital camera's biggest advantage is that it creates images digitally thus making it easy to transfer images between all kinds of devices and applications. For instance, one can easily insert digital images into word processing documents, send them by e-mail to friends, or post them on a Web site where anyone in the world can see them. Additionally, one can use photo-editing software to manipulate digital images to improve or alter them. For example, one can crop them, remove red-eye, change colors or contrast, and even add and delete elements. Digital cameras also provide immediate access to one's images, thus avoiding the hassle and delay of film processing. All told, digital photography is becoming increasingly popular because of the flexibility it gives the user when he or she wants to use or distribute an image.

In order to generate an image of quality that is roughly comparable to a conventional photograph, a substantial amount of information must be captured and processed. For example, a low-resolution 640×480 image has 307,200 pixels. If each pixel uses 24 bits (3 bytes) for true color, a single image takes up about a megabyte of storage space. As the resolution increases, so does the image's file size. At a resolution of 1024×768, each 24-bit picture takes up 2.5 megabytes. Because of the large size of this information, digital cameras usually do not store a picture in its raw digital format but, instead, apply compression technique to the image so that it can be stored in a standard compressed image format, such as JPEG (Joint Photographic Experts Group). Compressing images allows the user to save more images on the camera's "digital film," such as flash memory (available in a variety of specific formats) or other facsimile of film. It also allows the user to download and display those images more quickly.

Wavelet-based compression is the newest compression technology available on the consumer market. Wavelet technology enables digital images and video to be compressed by removing all obvious redundancy and using only the areas, which can be perceived, by the human eye primarily edges and shading changes which are generally represented by high frequencies. Wavelet technology filters the entire field or each frame at as a single entity. This approach results in smother images, as opposed to traditional JPEG style processing that may yield blocky images due to its block oriented processing. As a result, the technique provides a significant advantage for still images over the more traditional DCT-based methods that are used in the JPEG (baseline) industry standard. All told, wavelet-based methods offer the advantage of a better trade-off between complexity, compression, and quality. Accordingly, wavelet-based techniques are expanding in the field of still image and video compression at an ever-increasing rate.

The basic concept behind wavelets is that, rather than performing a tiling approach (i.e., breaking an image down into small segments), filters (and sub-band coding) are applied over the entirety of an image. This is illustrated in FIG. 1. First, a high pass filter and low pass filter are applied in parallel to separate the image, such that two results are generated one being the high-pass filtered results and low-pass filtered results, as shown at (a). Using Nyquist sampling theory, as the resultant images have reduced bandwidth, such that only half the amount of data is required for complete frequency representation, and thus the image can be sub-sampled by a factor of two with no information loss in the direction of filtering. This sub-sampling is simply done by removing every other resultant sample. This is done to both the high-pass and low pass results, such that the resultant data size is the same as the original image size. This approach is performed first in one direction either horizontal or vertical and then repeated in the other direction in a manner to produce four quadrants: first along an image's horizontal axis to produce high-pass and low-pass filtered halves, then repeating along an image's vertical access to produce high-pass and low-pass filtered quadrants, as shown at (b). Here, the upper left quadrant (Q1) represents low-pass horizontal and vertical image data. The upper right quadrant (Q2) represents high-pass horizontal and low-pass vertical image data. The lower left quadrant (Q3) represents low-pass horizontal and high-pass vertical image data. The lower right quadrant (Q4) represents high-pass horizontal and vertical image data. This process can be repeated at multiple levels, as shown at (c)–(e), by repeating the process on each resultant Q1 result each being a quarter the size of the previous level. This may continue until the resultant Q1 block is too small to continue further, yielding best compression.

Further description of the wavelet-based compression may be found, for instance, in the technical and trade literature. See e.g., Pigeon, S., *Image Compression with Wavelets*, Dr. Dobb's Journal, August 1999, pp. 111–115. The disclosure of the foregoing is hereby incorporated by reference, for all purposes.

Historically, wavelet processing has been implemented in software. In user-operated imaging devices, however, responsiveness to users is paramount. Therefore, there is great interest in finding a wavelet-based compression technique that is optimized for a given hardware environment. A particular problem arises when attempting to do hardware-based wavelet processing due to existing memory architecture, however. In particular, applying vertical filters using existing memory architecture is problematic.

Current memory architecture in widespread use (e.g., synchronous DRAMs—SDRAMs) is optimized for sequential data access in a horizontal manner, such as page-based or row-based access. For example, in the SDRAM memory commonly employed in PCs, horizontal access may be achieved on the order of 7–10 nanoseconds. This speed results from a pre-fetch pipelining mechanism, which is optimized for fetching the next data element (e.g., machine word) in a given row ("page"). Vertical access (e.g., accessing a pixel value below), in contrast, requires around 120 nanoseconds, a ten-fold increase in access cost. This increased cost results from the time-intensive task of switching to another row of memory cells. Here, the underlying memory access mechanism must be reconfigured to switch to the next memory page 2 to access the next group of bits.

One approach to mitigating the above limitation of current memory architecture is to employ alternative memory architecture—that is, forego use of RAM that is page oriented. One such example is static RAM (SRAM). Unfortunately, that approach has distinct disadvantages in terms of greatly increased cost, power requirements, and larger chip size. It is instead advantageous to find a solution that may be implemented using less-costly page-based memory architecture, if such a solution is possible.

All told, in a hardware-implemented wavelet processing approach, memory access becomes a limiting factor to a cost-effective solution. Therefore, there is great interest in finding a hardware-implemented wavelet-based compression solution that may be implemented in less-costly, page-based memory architecture (e.g., SDRAM), and do so in a manner that overcomes the inherent speed disadvantage encountered due to the horizontal-optimized access strategy employed by page-based memory architectures.

Glossary

The following definitions, which are provided for purposes of illustration not limitation, may assist in understanding the detailed discussion that follows.

ASIC: Short for Application Specific Integrated Circuit, a chip designed for a particular application. ASICs are built by connecting existing circuit building blocks in new ways. Since the building blocks already exist in a library, it is much easier to produce a new ASIC than to design a new chip from scratch.

JPEG: Short for Joint Photographic Experts Group, JPEG is a lossy compression technique for color images. Although it can reduce files sizes to about 5% of their normal size, some detail is lost in the compression. See e.g., Nelson, M. et al., *The Data Compression Book,* Second Edition, Chapter 11: Lossy Graphics Compression (particularly at pp. 326–330), M&T Books, 1996.

wavelet: A mathematical function used in compressing images. Images compressed using wavelets are smaller than JPEG images and can be transferred and downloaded at quicker speeds. See e.g., Pigeon, S., *Image Compression with Wavelets*, Dr. Dobb's Journal, August 1999, pp. 111–115.

SUMMARY OF THE INVENTION

An ASIC-implemented wavelet transformation engine (circuit) providing a wavelet filter is described. The wavelet filter itself provides up to a 9-stage FIR (finite impulse response) filter with symmetrical coefficients. The architecture of the filter includes data inputs, a bank of shift registers (register bank), coefficient registers, a multiplier/accumulator, a sub-sampling component, and output (results) registers. The design employs multiplexors for controlling inputs to the coefficient registers and output (results) registers.

The data inputs, which include high-pass inputs and low-pass inputs, feed into the register bank. In the currently preferred embodiment, a nine-tap filter is implemented, thus requiring that the register bank include nine registers for storing nine incoming data points. These data points or values are to be multiplied against nine coefficients, which are stored at coefficient registers. Two different sets of coefficients are used to do high- and low-pass filtering. With this configuration, a series of inputted data are shifted across/against a set of coefficients, which implement specific filter characteristics. The embodiment is fully programmable, so a variety of other wavelet filters up to nine-taps (symmetric or not) may be implemented.

In the currently preferred embodiment, the wavelet filter is configured to perform as a FBI 7–9 wavelet filter with zeros inserted in unused coefficient locations. As a simplification and performance enhancement technique, rather than filtering an entire row for both high-pass and low-pass filters and then dropping alternate results (as is possible from the Nyquist theorem), the low pass and high-pass filters are alternated such that only results are generated for either low-pass or high-pass, reducing the filter processing time by a half yet still yielding the full informational content of the underlying digital image.

DETAILED DESCRIPTION OF A PREFERRED EMBODIMENT

The following description will focus on the presently preferred embodiment of the present invention, which may be implemented in a low-cost ASIC (application-specific integrated circuit) chip. The present invention, however, is not limited to just ASIC-based implementations. Instead, those skilled in the art will find that the present invention may be advantageously embodied in other environments, including, for example, a field programmable gate array (FPGA) chip. Therefore, the description of the exemplary embodiments that follows is for purposes of illustration and not limitation.

I. ASIC-Based Implementation

The present invention may be implemented on an ASIC. An ASIC is an integrated circuit or "chip" that has been built for a specific application. Integrated circuits are traditionally designed with general-purpose functions that allow designers to design systems in the form of integrated circuit boards by connecting integrated circuits with selected functions to one another. For example, most integrated circuits have general functions, such as combinational logic, shift registers, and the like, and are connected to one another on circuit boards. Designers may use ASIC to consolidate many integrated circuits into a single package thereby reducing circuit board size requirements and power consumption. An ASIC implements custom functionality according to a description, which is provided in an abstract technology-independent fashion for instance using a Hardware Description Language (HDL), such as VHDL (Very High Speed Integrated Circuit Hardware Description Language) or Verilog Hardware Description Language.

ASICs may incorporate programmable logic arrays, field programmable gate arrays, cell based devices, and fully custom designed devices. ASICS may include such general function circuits that are connected to perform specific applications as systems, such as, a disk controller, a communications protocol, a bus interface, a voice coder, and the like. An ASIC may include on a single integrated circuit the circuitry that is typically built on a circuit board. ASIC devices are available from a variety of suppliers, including Fujitsu, Hyundai Electronics America, and Texas Instruments.

The use of an ASIC-based implementation is presented for purposes of illustrating the basic underlying architecture and operation of the present invention. An ASIC-based implementation is not necessary to the invention, but is used to provide a framework for discussion. Instead, the present invention may be implemented in any type of circuitry capable of supporting the processes of the present invention presented in detail below.

II. Implementation of a Wavelet Filter Using Low-Cost Memory

A. Design

1. Basic Architecture

Figure 1:
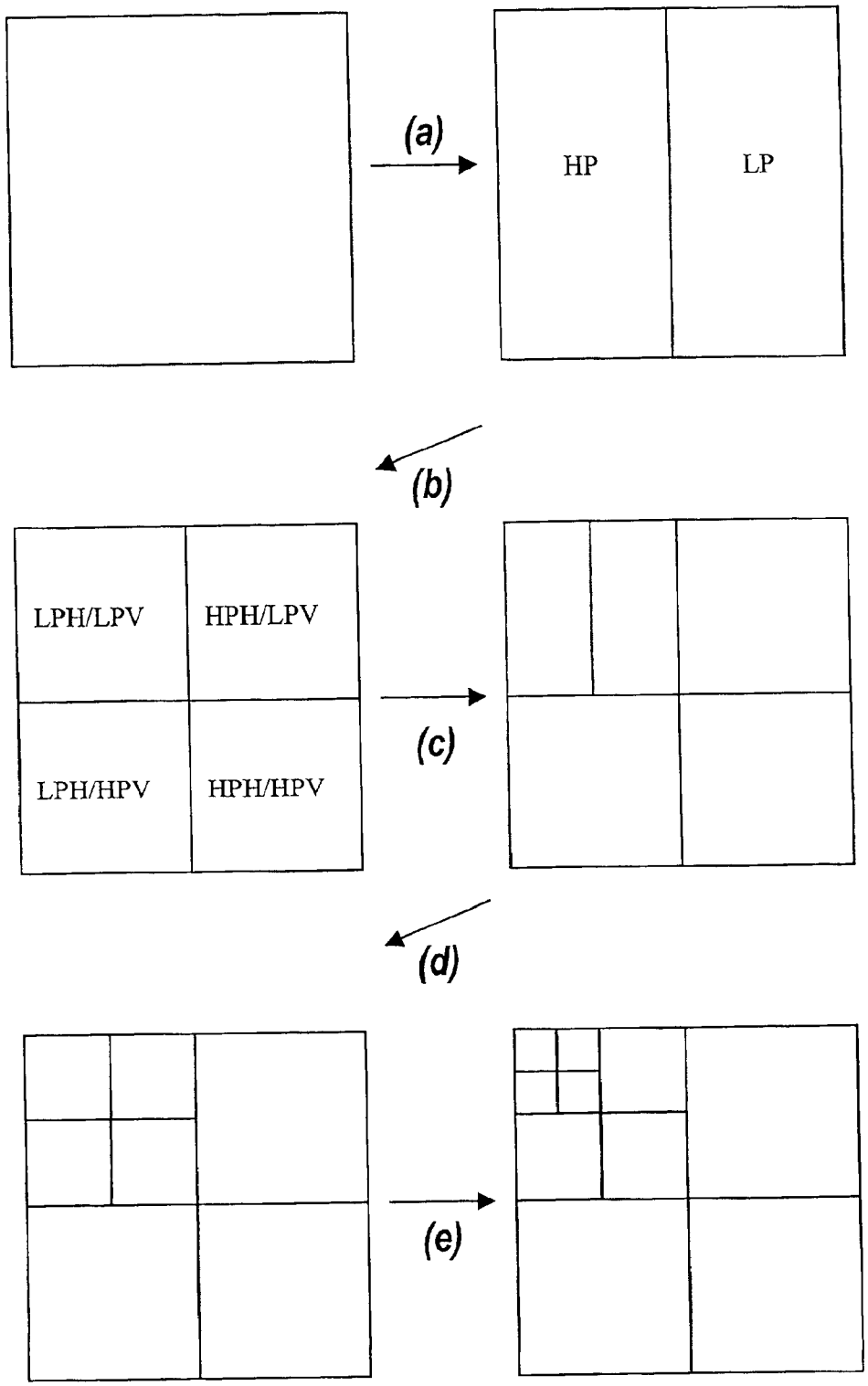
FIG. 1 is a block diagram illustrating wavelet-based image compression.
Figure 2A:
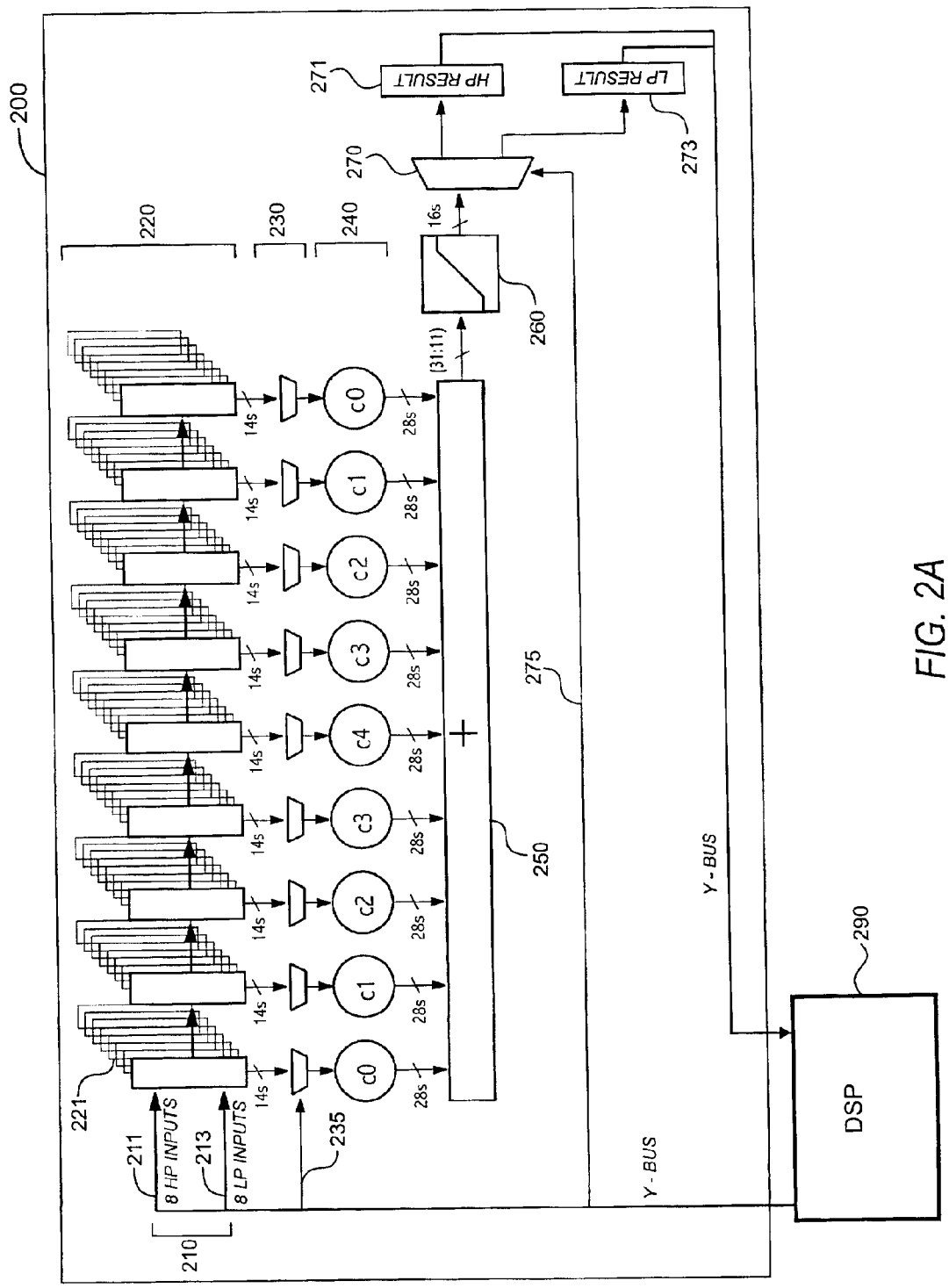
FIGS. 2A–B are schematic diagrams illustrating a preferred embodiment and an alternative embodiment of an ASIC-implemented wavelet transformation engine (circuit) of the present invention.

FIG. 2A is a schematic diagram showing an ASIC-implemented wavelet transformation engine (circuit) providing a wavelet filter 200 that operates under control of a DSP (digital signal processing) circuit 290, which includes or controls a clock providing clock tick at a specified time interval. As shown, the ASIC 200 includes data inputs 210, bank of shift registers (register bank) 220, multiplexor set 230, coefficient (registers) 240, multiplier/accumulator circuit 250, sub-sampling component 260, multiplexor 270, and output (results) registers 271, 273. In a clock-synchronized fashion, the DSP circuit 290 coordinates operation of the components.

The detailed design of the engine's filter 200 is as follows. The wavelet filter 200 provides up to a 9-stage FIR (finite impulse response) filter with coefficients that can be symmetrical or nonsymmetrical as desired. At a particular clock interval, successive pixels in the DSP-controlled image memory are shifted (e.g., horizontally, for application of a horizontal filter) into the register bank 220. In this manner, the register bank 220, at any given time, is employed to provide a neighborhood of pixel values for a particular pixel from the underlying digital image. Here, in a clock-synchronized fashion, pixel values (from the current neighborhood under exam) are copied into the register bank 220: the data inputs 210, which include high-pass inputs 211 (WT_HP_IN_1 through WT_HP_IN_8) and low-pass inputs 213 (WT_LP_IN_1 through WT_LP_IN_8), feed into the register bank 220.

In the currently preferred embodiments, the DSP 290 itself may be Inicore's iniDSP or other similar processors from other various DSP vendors (e.g., Fujitsu, Hyundai, Texas Instruments, or the like). Further, the DSP can also be replaced by a general-purpose processor (e.g., Intel-based or Motorola-based), or even a DMA engine. DSP's are preferred as in general they contain DAG (data address generation) units that are optimized for this type of (e.g., image-based) data movement yet remain programmable. General purpose processors, on the other hand, might be preferred in low cost applications in which a DSP does not provide enough flexibility (and two processor would not be cost effective). A "hardwired" DMA engine may provide the fastest implementation, but has the disadvantage of lack of programmability.

In the currently preferred embodiment, a nine-tap filter is implemented, thus requiring that the register bank 210 include nine registers for storing nine incoming data points, as is illustrated in the figure. These data points or values are to be multiplied against nine coefficients (pixel weightings), which are stored at coefficient registers 240. Two different sets of coefficients are used to do high-pass filtering and low-pass. Assuming symmetrical coefficients each set need only store five values for populating the nine coefficient registers 240: WP_HP_COEFF0 through WP_HP_COEFF4 for high pass filtering, and WP_LP_COEFF0 through WP_LP_COEFF4 for low pass filtering. With the above configuration and under control of DSP 290, a series of inputted data are shifted across/against a set of coefficients (stored at 240), which implement specific filter characteristics. The embodiment is fully programmable, so a variety of other wavelet filters up to nine-taps (symmetric or not) may be implemented.

In the currently preferred embodiment, the wavelet filter 200 is configured to perform as a FBI 7–9 wavelet filter with zeros inserted in unused coefficient locations. As a simplification and performance enhancement technique, rather than filtering an entire row for both high-pass and low-pass filters and then dropping alternate results, as is possible from the Nyquist theorem (as mention in the wavelet filter description), the low pass and high-pass filters are alternated such that only results are generated for either low-pass or high-pass, reducing the filter processing time by a half yet still yielding the full informational content of the digital image.

To increase performance for column processing, an 8-stage pipelined filter is actually used (8 parallel filters are implemented) at each register position (within register bank 220), thus allowing the 9-stage filter 200 to in fact process eight image columns in parallel (pipelined). The background shadows (e.g., shown at 221) represent eight lines that are to be processed in parallel. Thus, at a given instance, the filter selects which line of data is to be processed at a given instance. This selection is effected using the multiplexor set 230, which operates under control of the DSP 290 (via MUX control line 235). The lowest three address bits are used to select which filter is being used. The filter with the lowest three address bits equal to "000" has special mirroring features described below.

The following table summarizes the functionality of each of the foregoing registers and accompanying support registers (WT_SATURATION and WT_CTRL, described below).

TABLE 1

| Register | Size | Access | Description |
|---|---|---|---|
| WT_HP_IN_1–8 | 15:2 | W | High pass filter inputs 1–8 (left aligned) |
| WT_LP_IN_1–8 | 15:2 | W | Low pass filter inputs 1–8 (left aligned) |
| WT_HP_RESULT | 16 | R | High pass filter result |
| WT_LP_RESULT | 16 | R | Low pass filter result |
| WT_SATURATION | [0] | R | High pass saturation flag |
| (These two flags are | | | '0': no saturation |
| sticky bits; one they | | | '1': clear high pass saturation flag |
| are set because of | | W | Clear high pass saturation flag |
| saturation, they will | | | '0': no action |
| remain set until | | | '1': clear high pass saturation flag |
| they are cleared by | [1] | R | High pass saturation flag |
| software.) | | | '0': no saturation |
| | | | '1': clear high pass saturation flag |
| | | W | Clear high pass saturation flag |
| | | | '0': no action |
| | | | '1': clear high pass saturation flag |
| WT_HP_COEFF0 | 15:2 | R/W | high-pass coefficient 0 (1:0 => "00") |
| WT_HP_COEFF1 | 15:2 | R/W | high-pass coefficient 1 (1:0 => "00") |
| WT_HP_COEFF2 | 15:2 | R/W | high-pass coefficient 2 (1:0 => "00") |
| WT_HP_COEFF3 | 15:2 | R/W | high-pass coefficient 3 (1:0 => "00") |
| WT_HP_COEFF4 | 15:2 | R/W | high-pass coefficient 4 (1:0 => "00") |
| WT_LP_COEFF0 | 15:2 | R/W | low-pass coefficient 0 (1:0 => "00") |
| WT_LP_COEFF1 | 15:2 | R/W | low-pass coefficient 1 (1:0 => "00") |
| WT_LP_COEFE2 | 15:2 | R/W | low-pass coefficient 2 (1:0 => "00") |
| WT_LP_COEFF3 | 15:2 | R/W | low-pass coefficient 3 (1:0 => "00") |
| WT_LP_COEFF4 | 15:2 | R/W | low-pass coefficient 4 (1:0 => "00") |
| WT_CTRL | [0] | W | mirror start |
| | | | '0': no action |
| | | | '1': the next write to WT_HP_IN_1 or |
| | | | WT_LP_IN_1 mirrors the oldest 4 values |
| | | | and clears this bit |
| | [1] | W | mirror end |
| | | | '0': no action |
| | | | '1': mirror the last 4 values |
| | [2] | W | shift end with high pass coefficients |
| | | | '0': no action |
| | | | '1': shift one end value into filter |
| | [3] | W | shift end with low pass coefficients |
| | | | '0': no action |
| | | | '1': shift one end value into filter |

2. Alternative Embodiment

Figure 2B:
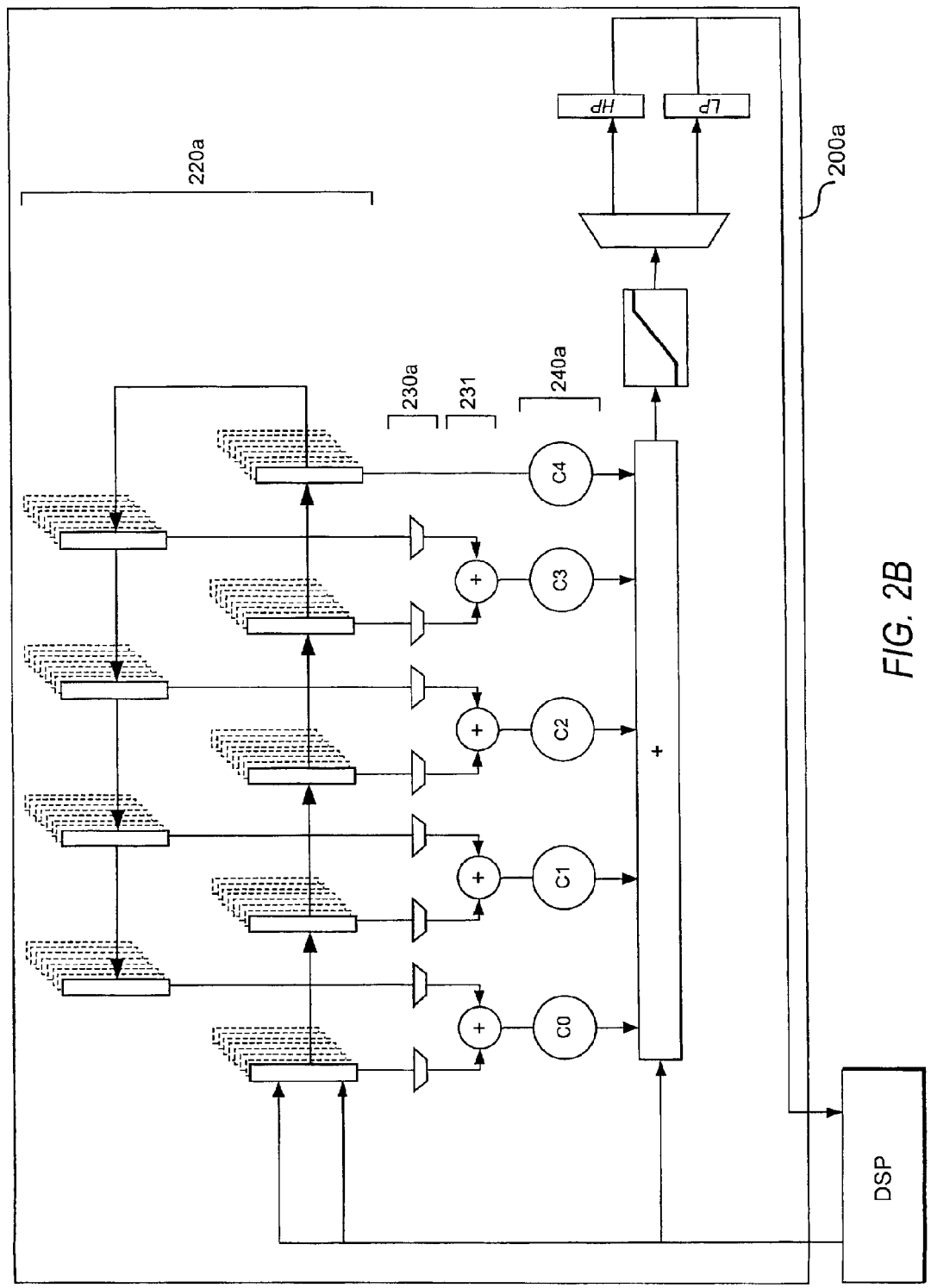

Since the filter is often symmetric (i.e., symmetrical about center coefficient c4), the present invention may be implemented in the alternative embodiment illustrated in FIG. 2B. More particularly, in the alternative wavelet filter embodiment 200a, the symmetry of the filter is used to reduce the hardware required and thus the area (cost) and power consumption of the chip. By knowing that given pairs of coefficients (other than the center coefficient) are the same, the alternative embodiment may employ a single multiplier for that corresponding coefficient after summing the input data, resulting in a mathematically equivalent operation. Thus, the embodiment is modified such that the output of eight of the nine registers bank (register bank 220a) is fed, via multiplexor circuitry 230a, to accumulators 231; the number of required coefficient registers (now shown at 240a) is reduced from nine to five.

As two of the values to be filtered will be multiplied by the same number, one can use the communicative property of multiplication to add the two numbers and then perform a single multiply:

$$A*N+B*N=(A+B)*N$$

The multipliers require by far the largest number of gates and thus power and area. Thus, the reduced version will be close to 5/9ths the size of the full version (the center coefficient remains). The reduced version is slower in operation as there is an additional addition operation added to the pipeline, but the reduced size and width of operations counteract this limitation.

All told, the reduced alternative version is more cost effective and power efficient. However, it limits the application to symmetric wavelet filters. Using the full nine coefficient architecture, on the other hand, allows for maximum flexibility by being able to use any symmetric or non-symmetric for either wavelet processing or more general FIR filter processing, which may be useful in other operations within modern digital cameras. The full version also allows for increased speed relative to the reduced version due to the fewer operations in the processing pipeline.

3. Mirroring Features

Although FIR filters assume that the available data is continuous, this is not a reasonable assumption in most applications. That is especially the case for image processing applications in which each row or column of data is processed individually and thus provides two end conditions which must be constrained to control the filter response. Multiple possible mechanisms exist to constrain the end conditions. The one selected in the currently preferred embodiment is mirroring in which the data at each end of the line of data being filtered is mirrored. This mechanism both controls the filter response and guarantees that the image can be accurately reconstructed. There is an additional benefit for performance as this allows this repeated data to be read only once saving valuable processing time.

Figure 3A:
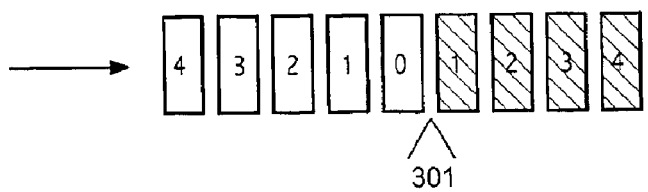
FIGS. 3A–B present block diagrams illustrating a mirroring function of the filter, in which the data at each end of a line of data being filtered is mirrored.
Figure 3B:
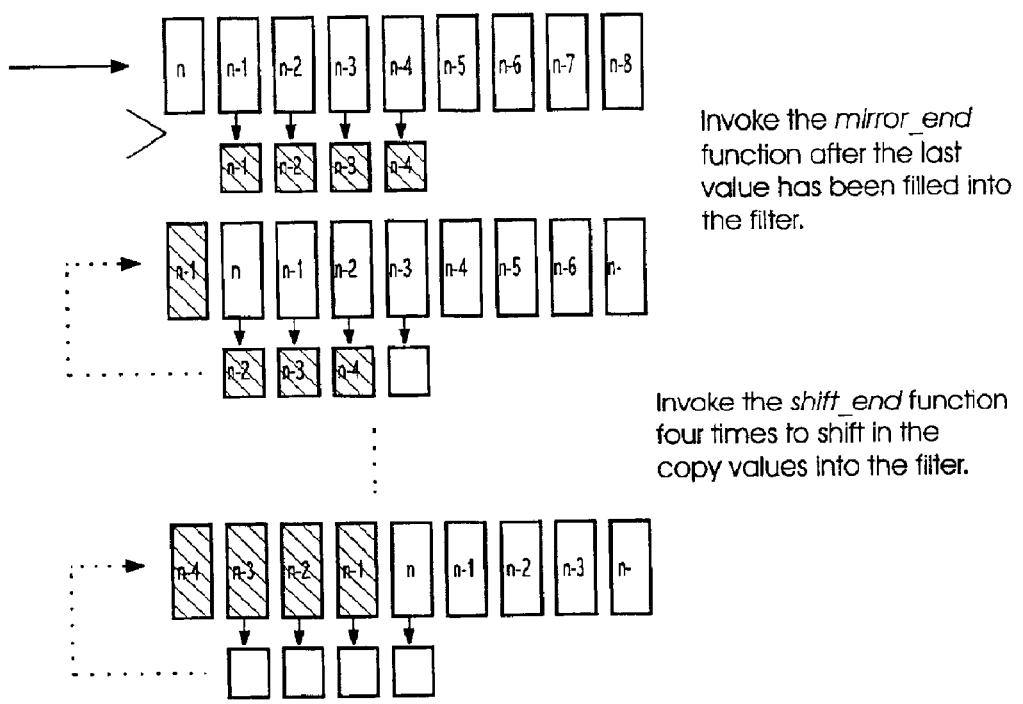

As illustrated in FIGS. 3A–B, this is accomplished by a hardware data copy mechanism that repeats the appropriate data elements to implement a "mirroring" feature. In FIG. 3A, the nine blocks in the figure represents the 9-stage filter with the lowest three address bits equal to "000", either WT_HP_IN_1 or WT_LP_IN_1. Here, after the first four elements are placed into the filter, a mirror_start function is initiated. This is specified by values placed in a 4-bit control register (WT_CTRL), as illustrated in Table 1. A "mirror start" bit 301 is set after the first four values have been filled into the filter. The mirror happens when writing value #4 into the filter. This causes the four data elements preceding the edge of the row to be copied in reverse order such that the filter receives symmetric data centered on the edge of the image.

FIG. 3B illustrates a mirror_end function, which is used in combination with a shift_end function. The mirror_end function is invoked after the last value has been filled into the filter. This is followed by invoking the shift_end function four times to shift in the copy values into the filter. To apply this mirror feature to column processing as well, one can simply read the columns in the desired order; no explicit mirroring is needed.

B. Image Filtering Operation

Basic operation of the wavelet filter of the present invention will be described by illustrating specific operational steps employed by the wavelet filter 200 for filtering images. The specific steps of the process, which operate under the timing control of the DSP chip 290, are as follows. During use of the filter, a target image exists in external memory (e.g., SDRAM). It is read in, in a burst of eight consecutive pixels, in a horizontal line for application of a horizontal filter. The pixels are brought into memory that is accessible to the DSP chip 290. Given the nine registers across the top, as the filter walks across the line of image data (i.e., receives input comprising successive lines of image data), the filter shifts data in from one side of the register bank 220 to the other side (e.g., from left to right for the embodiment shown in FIG. 2A), so that the register bank 220 stores a sequence of pixels from image memory (e.g., taken from successive horizontal lines of the image, for application of a horizontal filter).

The first data element (i.e., first word pixel, which is 16 bits in size) is written into the low pass zero register. Next, the low pass filtering coefficients are applied, and a low pass result is generated. The second data element is written into the high pass zero register. Similarly, filtering occurs using the high-pass coefficients, with a high pass result being generated. Thus during operation, the filter alternates between high pass and low pass. Here, the data shifts by one (pixel value) but alternates between using high pass or low pass coefficients. In the case of vertical filtering (i.e., filtering pixels where neighbors are located vertically), the eight pixels from the first row are placed in the low-pass registers. The second row is placed in the high-pass registers. In other words, odd number rows are placed in the low pass registers; even number rows are placed in the high pass registers.

As previously described, the coefficients set 240 stores the nine coefficients that are applied against the image data values held by the register bank 220. In the currently preferred embodiment, the filter is symmetric. Thus, the first and last coefficients store the same value (shown as c0), the second and eighth coefficients store the same value (shown as c1), and so forth and so on, with the center coefficient (shown as c4) being the only unique value. The filter alternates such that the odd pixel values (i.e., 1st, 3rd, and 5th and 7th values) are placed in the low pass registers, with the even the pixel values being placed in the high pass registers. The coefficient set 240 is multiplied/accumulated against the data set using the multiplier/accumulator circuit 250. Based on the pixel values from the supplied pixel neighborhood and based on the coefficient weightings, the multiplier/adder circuit generates a new pixel value. This resulting data is, in turn, saturated down to a 16-bit value (i.e., taking the most significant 16 bits), as shown by the sub-sampling component 260. The operation of the sub-sapling component 260 (e.g., enabling and disabling) is configurable by setting specific flags in the WT_SATURATION register (listed in Table 1).

Using multiplexor 270, the resulting output (i.e., newest result data element) is returned as a low pass result in low-pass result register 273 (WT_LP_RESULT) when the filter is processing a low pass filter, or is returned as a high-pass result in high-pass result register 271 (WT_HP_RESULT) when the filter is processing a high pass filter. Operation of the multiplexor 270 is under control of the DSP 290, via MUX control line 275. The foregoing processing is repeated for all of the pixels of the underlying image for rendering an image-processed (i.e., wavelet transformed) version of that image.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. A wavelet transformation circuit comprising:

a set of data inputs;

a bank of shift registers, for loading a succession of pixel value from a digital image, each successive pixel value being loaded at a preselected clock interval;

a set of coefficient registers that correspond to said bank of shift registers, for storing coefficient values implementing a wavelet filter;

a multiplier/accumulator circuit that generates, at said preselected clock interval, a result based on application of said coefficient values against the succession of pixel values stored by said bank of shift registers; and at least one result register for storing said result.

2. The circuit of claim 1, wherein said wavelet transformation engine operates under control of a digital signal processor (DSP).

3. The circuit of claim 2, wherein said DSP controls a memory for storing a digital image as a sequence of pixel values.

4. The circuit of claim 2, wherein said DSP controls a clock providing a timing signal at said preselected clock interval.

5. The circuit of claim 1, wherein said bank of shift registers comprises nine registers for storing nine incoming data.

6. The circuit of claim 1, wherein said coefficient registers comprises nine registers for storing nine coefficient values.

7. The circuit of claim 1, wherein said coefficient values are symmetric about a center coefficient.

8. The circuit of claim 1, wherein said coefficient values are asymmetric.

9. The circuit of claim 1, wherein said wavelet transformation circuit functions to provide up to a 9-stage finite impulse response (FIR) filter.

10. The circuit of claim 1, wherein said set of data inputs comprise high-pass inputs and low-pass inputs.

11. The circuit of claim 10, wherein said set of coefficient registers is loaded with coefficient values drawn from two different sets of coefficients, a high-pass set of coefficients employed for high-pass filtering and a low-pass set of coefficients employed for low-pass filtering.

12. The circuit of claim 11, wherein said high-pass set up coefficients and said low-pass set of coefficients are alternated, such that for a particular sequence of pixel values currently loaded in said bank of shift registers, only a single result is generated for either low-pass or high-pass.

13. The circuit of claim 1, wherein said set of coefficient registers stores a value of 0 in any coefficient register corresponding to an unused coefficient location.

14. The circuit of claim 1, wherein said bank of shift registers further comprises a multi-stage pipelined filter, such that each register position comprises a plurality of registers to be processed in parallel.

15. The circuit of claim 14, wherein said multi-stage pipelined filter comprises an 8-stage pipelined filter having eight parallel registers implemented at each register position.

16. The circuit of claim 15, further comprising a multiplexor circuit for controlling which particular parallel registers are multiplied against said set of coefficient registers at a given instance in time.

17. The circuit of claim 15, wherein said 8-stage pipelined filter is loaded in a burst of eight consecutive pixels in a horizontal line from the digital image, for application of a horizontal filter.

18. The circuit of claim 1, wherein said data inputs are shifted across said bank of shift registers, so that they can be multiplied against values stored by said set of coefficient registers.

19. The circuit of claim 1, further comprising:
a sub-sampling component for saturating down said result to a value having a preselected bit width.

20. The circuit of claim 1, wherein said result is saturated down to a 16-bit value, by taking the most significant 16 bits of said result.

21. The circuit of claim 1, wherein said at least one result register comprises:
a low-pass result register for storing a low-pass result, and
a high-pass result register for storing a high-pass result.

22. The circuit of claim 21, further comprising a multiplexor circuit for controlling whether said result is placed in said low-pass result register or in said high-pass result register.

23. The circuit of claim 1, wherein said result comprises a new pixel value being determined from a then-current sequence of pixel values stored in said bank of shift registers and from said coefficient values stored by said coefficient registers.

24. The circuit of claim 1, wherein successive lines of pixel values are shifted in from the digital image, for application of a horizontal filter.

25. The circuit of claim 1, wherein successive columns of pixel values are shifted in from the digital image, for application of a vertical filter.

26. The circuit of claim 1, further comprising a mirroring function that mirrors data appearing at each end of a line of data being processed, during application of a horizontal filter.

27. The circuit of claim 1, further comprising a mirroring function that mirrors data appearing at each end of a column of data being processed, during application of a vertical filter.

28. The circuit of claim 1, wherein said circuit is implemented as an application-specific integrated circuit (ASIC).

29. The circuit of claim 1, wherein results obtained for the digital image are combined to produce a wavelet-based compressed image.

30. A method for performing high-pass and low-pass filtering required for a wavelet transformation, the method comprising:
storing a high-pass set of coefficient values for high-pass filtering, and a low-pass set of coefficient values for low-pass filtering;
shifting into a bank of shift registers a succession of pixel values from a digital image; and
as each successive pixel value is shifted in, alternating between
generating a high-pass result based on application of said high-pass coefficient values against the then-current pixel values stored by said bank of shift registers, and
generating a low-pass result based on application of said low-pass coefficient values against the then-current pixel values stored by said bank of shift registers.

31. The method of claim 30, wherein said steps operate under control of a digital signal processor (DSP).

32. The method of claim 31, wherein said pixel values are shifted in from a memory accessible to said DSP.

33. The method of claim 31, wherein said DSP controls a clock providing a timing signal at a preselected clock interval.

34. The method of claim 30, wherein said bank of shift registers comprises nine registers for storing nine incoming data.

35. The method of claim 30, wherein the two sets of coefficient values each comprise five coefficient values.

36. The method of claim 30, wherein each set of coefficient values is symmetric about a center coefficient.

37. The method of claim 30, wherein each set of coefficient values is asymmetric.

38. The method of claim 30, wherein said high-pass set up coefficients and said low-pass set of coefficients are alternated, such that for a particular sequence of pixel values currently loaded in said bank of shift registers, only a single result is generated for either low-pass or high-pass.

39. The method of claim 30, wherein said bank of shift registers operates in parallel with other registers to provide a multi-stage pipelined filter, such that each register position of said bank of shift registers comprises a plurality of registers to be processed in parallel.

40. The method of claim 39, wherein said multi-stage pipelined filter comprises an 8-stage pipelined filter having eight parallel registers implemented at each register position.

41. A wavelet filter circuit providing up to a nine stage finite input response filter, said circuit comprising:
a set of high-pass and a set of low-pass data inputs;
a bank of shift registers for storing data values received from said data inputs;
coefficient registers for alternately storing a set of coefficients for high-pass filtering and a set of coefficients for low-pass filtering; and
a multiplier/accumulator for applying coefficients stored in said coefficient registers against said data values in said shift registers to generate new values.

42. The circuit of claim 41, further comprising:
a sub-sampling component for saturating down said new values to result values having a preselected bit width.

43. The circuit of claim 41, further comprising:
a low-pass result register and a high-pass result register for storing said low-pass filtered and high-pass filtered result values, respectively.

44. The circuit of claim 41, wherein said wavelet filter circuit operates under the control of a digital signal processing (DSP) circuit.

45. The circuit of claim 44, wherein said DSP circuit controls a clock providing a clock tick at specified intervals.

46. The circuit of claim 41, wherein said data values input to said shift registers comprise pixel values from digital images.

47. The circuit of claim 46, wherein said shift registers comprises nine shift registers storing adjacent pixel values from a particular digital image.

48. The circuit of claim 41, wherein each register position of the register bank comprises a plurality of registers to be processed in parallel, for implementing a multi-stage pipelined filter.

49. The circuit of claim 48, wherein said multi-stage pipelined filter comprises an eight-stage pipelined filter having eight parallel registers at each register position.

50. The circuit of claim 49, wherein eight successive data values are written into said eight parallel registers at each said register position for parallel processing.

51. The circuit of claim 49, wherein use of high-pass and low-pass coefficients is alternated as each successive data value is read in for processing.

52. The circuit of claim 41, wherein said coefficients comprise pixel weightings.

53. The circuit of claim 41, wherein said set of coefficients include five high-pass coefficients and five low-pass coefficients.

54. The circuit of claim 41, wherein said wavelet filter circuit is configured to perform as a FBI 7–9 wavelet filter with zeros inserted in unused coefficient locations.

55. The circuit of claim 41, wherein input into said shift registers alternates input of successive data values from said set of high-pass data inputs and said set of low-pass data inputs.

56. The circuit of claim 55, wherein for a particular sequence of data values input into said shift registers, only a single result is generated for either high-pass or low-pass filtering.

57. The circuit of claim 41, wherein said coefficients stored in said coefficients register are symmetric around a center coefficient.

58. The circuit of claim 41, wherein only a single coefficient register a unique value.

59. The circuit of claim 41, wherein for a particular sequence of data values loaded in said shift registers, only a single result is generated for either high-pass or low-pass filtering.

60. The circuit of claim 41, further comprising a sub-sampling component that saturates down each new value to a 16-bit value.

61. The circuit of claim 60, wherein said sub-sampling component saturates down said new values to said 16-bit value by selecting the most significant 16 bits.

62. The circuit of claim 41, wherein said wavelet filter circuit renders wavelet-transformed versions of digital images.

63. A method for rendering wavelet-transformed versions of digital images, said method comprising:
inputting successive pixel values from a digital image into a bank of shift registers;
applying pixel weightings against the then current pixel values in said bank of shift registers, alternating between high-pass pixel weightings and low-pass pixel weightings to generate a set of high-pass values and a set of low-pass values, respectively; and
outputting said high-pass values and said low-pass values in a result register.

64. The method of claim 63, further comprising:
saturating down each said high-pass value and each said low-pass value to a result value to a pre-selected bit width.

65. The method of claim 64, wherein each said high-pass value and each said low-pass value is saturated down by selecting the most significant bits of said value.

66. The method of claim 65, wherein said shift registers comprise a bank of nine shift register positions, each said register position including eight parallel registers for parallel processing of pixel values.

67. The method of claim 63, wherein high-pass pixel weightings and low-pass pixel weightings are applied in an alternating fashion to the successive pixel values.

68. The method of claim 63, wherein said pixel weightings comprise a set of five high-pass weightings and a set of five low-pass weightings.

69. The method of claim 63, further comprising:
mirroring the pixel values at the start of each line of said digital image by copying the first four pixel values in reverse order after the fourth pixel value has been filled into said shift registers such that the filter receives symmetric data centered on the edge of the image.

70. The method of claim 63, further comprising:
mirroring the pixel values at the end of each line of said digital image by copying the last four pixel values in reverse order after the last pixel value has been filled into said shift registers such that the filter receives symmetric data centered on the edge of the image.

* * * * *